United States Patent Office 3,196,077
Patented July 20, 1965

---

3,196,077
PROCESS FOR CULTIVATING FOOT AND MOUTH DISEASE VIRUS ON ADULT PIG SKIN EPITHELIUM
Werner Pilz, Cologne-Longerich, Otto-Erich Schweckendiek, Cologne-Poll, Otto Armbruster, Cologne-Deutz, and Heinz-Georg Garbe, Bensberg, Germany, assignors to Farbenfabriken Bayer Aktiengesellschaft, Leverkusen, Germany, a corporation of Germany
No Drawing. Filed Oct. 17, 1962, Ser. No. 231,267
7 Claims. (Cl. 167—78)

This invention relates to a process for cultivating the virus of foot and mouth disease on adult pig skin epithelium. More particularly, the present invention relates to the cultivation of the virus of foot and mouth disease on the explanted epithelium of the outer skin of adult slaughtered pigs.

This application is a continuation-in-part of application Serial No. 71,130, filed November 23, 1960, now abandoned, by the inventors herein.

It is known that the virus of foot and mouth disease (FMD) can be multiplied in vivo on the tongue of cattle. (Waldmann, Pyl, Hobohn, and Möhlmann, Zbl. Bakt. I. Orig. 1941, vol. 148, p. 1.)

Frenkel was able to multiply the FMD-virus on a large scale on the tongue epithelium of slaughtered cattle in suitable nutrient solutions. (Frenkel, Am. J. Vet. Res., vol. XII, pp. 187–190 (1951) and vol. XI, pp. 371–373 (1950).)

Quite recently, cultivation has also been achieved in kidney cell cultures. (Bachrach, Science 1955, vol. 122, pp. 1269–1270; Sellers, Nature 1955, vol. 176, pp. 547–549.)

Since the cultivation of FMD virus according to Frenkel has until now been carried out exclusively with beef tongue epithelium from slaughtered cattle, and since difficulties are experienced in providing a sufficient number of beef tongues for large scale production, it has been necessary to find a method of replacing beef tongue epithelium. Such a possibility is offered by the process according to the invention.

Accordingly, it has now been discovered that FMD virus and particularly FMD virus of type A, type C, type O, type Asia 1 and type S.A.T. (Southern African Territories) 1, 2 and 3 can be cultivated uniquely in high potencies in mass virus cultures by the method that comprises incubating the explanted epithelium of the outer skin of adult slaughtered pigs in Frenkel's nutrient solution and in the presence of FMD virus. Antibiotics such as streptomycin, penicillin and chloramphenicol are normally included in the tissue culture to insure bacteriostasis without damage to the cells.

The following examples are further illustrative of the invention.

Example 1

The nutrient solution employed in this and the following examples had the following composition:

| | | |
|---|---|---|
| L histidine monohydrochloride W | g | 0.038 |
| DL tryptophane W | g | 0.100 |
| DL phenylalanine W | g | 0.050 |
| L leucine W | g | 0.130 |
| DL methionine W | g | 0.200 |
| L arginine monohydrochloride | g | 0.050 |
| L lysine hydrochloride | g | 0.200 |
| DL Threonine (allo threonine free) | g | 0.085 |
| L cysteine hydrochloride | g | 0.125 |
| Niacine (acid, nicotinic) | g | 0.001 |
| Ca-panthothenate dextrorotatory | mg | 0.250 |
| Hemine cryst. | mg | 0.036 |
| Thyroxine | mg | 0.009 |
| Insuline | units | 0.9 |
| Pepton | g | 3.000 |
| Glucose p.a. | g | 1.000 |
| Sodium chloride p.a. | g | 7.200 |
| Potassium chloride p.a. | g | 0.180 |
| Calcium chloride anhydr. p.a. | g | 0.180 |
| Magnesium chloride $6 \cdot H_2O$ p.a. | g | 0.090 |
| Sodium dihydrogen phosphate p.a. | g | 0.045 |
| Sodium bicarbonate p.a. | g | 1.000 |
| Isobuffer * | ml | 32 |
| Aqua dest. | ml | 1000 |

W = dissolve in warm water.
* Isobuffer:

| | | |
|---|---|---|
| $NaH_2PO_4 \cdot 2H_2O$ p.a. | g | 2.6 |
| $Na_2HPO_4 \cdot 12H_2O$ p.a. | g | 36.0 |
| Aqua dest. | ml | 1092 |

One litre of this nutrient solution is prepared according to the method of Frenkel (Am. J. Vet. Res., vol. XI, pages 371–373 (1950) and Am. J. Vet. Res., vol. XII, pages 187–190 (1951)). The formulation is as follows:

0.55 g. of antibiotics (0.5 g. of streptomycin sulfate, 0.05 g. of chloramphenicol)
100 g. of outer skin epithelium from pigs
50 ml. of virus solution, type C.

Before incubating, the count of the solution virus concentration was $10^{-4.5}$.

After incubating, the count of the solution virus concentration was $10^{-6.2}$.

Vaccines prepared with the FMD virus, type C, cultivated on adult slaughtered pig skin epithelium which do not differ in effectiveness from vaccines which are prepared with virus material cultivated according to other methods are thus effected.

Example 2

One litre of nutrient solution is prepared according to the method of Example 1. The formulation is as follows:

0.55 g. of antibiotics (0.5 g. of streptomycin sulfate, 0.05 g. of chloramphenicol)
100 g. of outer skin epithelium from pigs
50 ml. of virus solution, type A.

Before incubating, the count of the solution virus concentration was $10^{-3.5}$.

After incubating, the count of the solution virus concentration was $10^{-6.0}$.

Example 3

One litre of nutrient solution is prepared according to the method of Example 1. The formulation is as follows:

0.55 g. of antibiotics (0.5 g. of streptomycin sulfate, 0.05 g. of chloramphenicol)
100 g. of outer skin epithelium from pigs
50 ml. of virus solution, type O.

Before incubating, the count of the solution virus concentration was $10^{-4.2}$.

After incubating, the count of the solution virus concentration was $10^{-6.3}$.

Example 4

One litre of nutrient solution is prepared according to the method of Example 1. The formulation is as follows:

0.55 g. of antibiotics (0.5 g. of streptomycin sulfate, 0.05 g. of chloramphenicol)
100 g. of outer skin epithelium from pigs
50 ml. of virus solution, type Asia 1.

*Example 5*

One litre of nutrient solution is prepared according to Example 1. The formulation is as follows:

0.55 g. of antibiotics (0.5 g. of streptomycin sulfate, 0.05 g. of chloramphenicol)
100 g. of outer skin epithelium from pigs
50 ml. of virus solution, type S.A.T. 1.

What is claimed is:

1. Process for cultivating the virus of foot and mouth disease that comprises incubating the epithelium of the outer skin of slaughtered adult pigs in nutrient solution and in the presence of the virus of foot and mouth disease.

2. Process for cultivating the virus of foot and mouth disease that comprises incubating the epithelium of the outer skin of slaughtered adult pigs in nutrient solution and in the presence of the virus of foot and mouth disease selected from the group consisting of type A, type C, type O, type Asia 1 and type S.A.T.

3. Process for cultivating the virus of foot and mouth disease that comprises incubating the explanted epithelium of the outer skin of adult pigs in nutrient solution and in the presence of the virus of foot and mouth disease of type A.

4. Process for cultivating the virus of foot and mouth disease that comprises incubating the explanted epithelium of the outer skin of adult pigs in nutrient solution and in the presence of the virus of foot and mouth disease of type C.

5. Process for cultivating the virus of foot and mouth disease that comprises incubating the explanted epithelium of the outer skin of adult pigs in nutrient solution and in the presence of the virus of foot and mouth disease of type O.

6. Process for cultivating the virus of foot and mouth disease that comprises incubating the explanted epithelium of the outer skin of adult pigs in nutrient solution and in the presence of the virus of foot and mouth disease of type Asia 1.

7. Process for cultivating the virus of foot and mouth disease that comprises incubating the explanted epithelium of the outer skin of adult pigs in nutrient solution and in the presence of the virus of foot and mouth disease of type S.A.T.

References Cited by the Examiner

Drug Trade News, Nov. 7, 1955, p. 60.

Frenkel: Biol. Abst., vol. 10, No. 5, Abst. No. 11284, p. 1208, May 1936.

Sanders: A.M.A. Arch. of Pathol., August 1953, vol. 56, No. 2, p. 180.

JULIAN S. LEVITT, *Primary Examiner.*

F. CACCIAPAGLIA, Jr., *Examiner.*